Jan. 1, 1952     M. L. BLAIR ET AL     2,580,648
AIR CLEANER
Filed Jan. 21, 1946     3 Sheets-Sheet 1
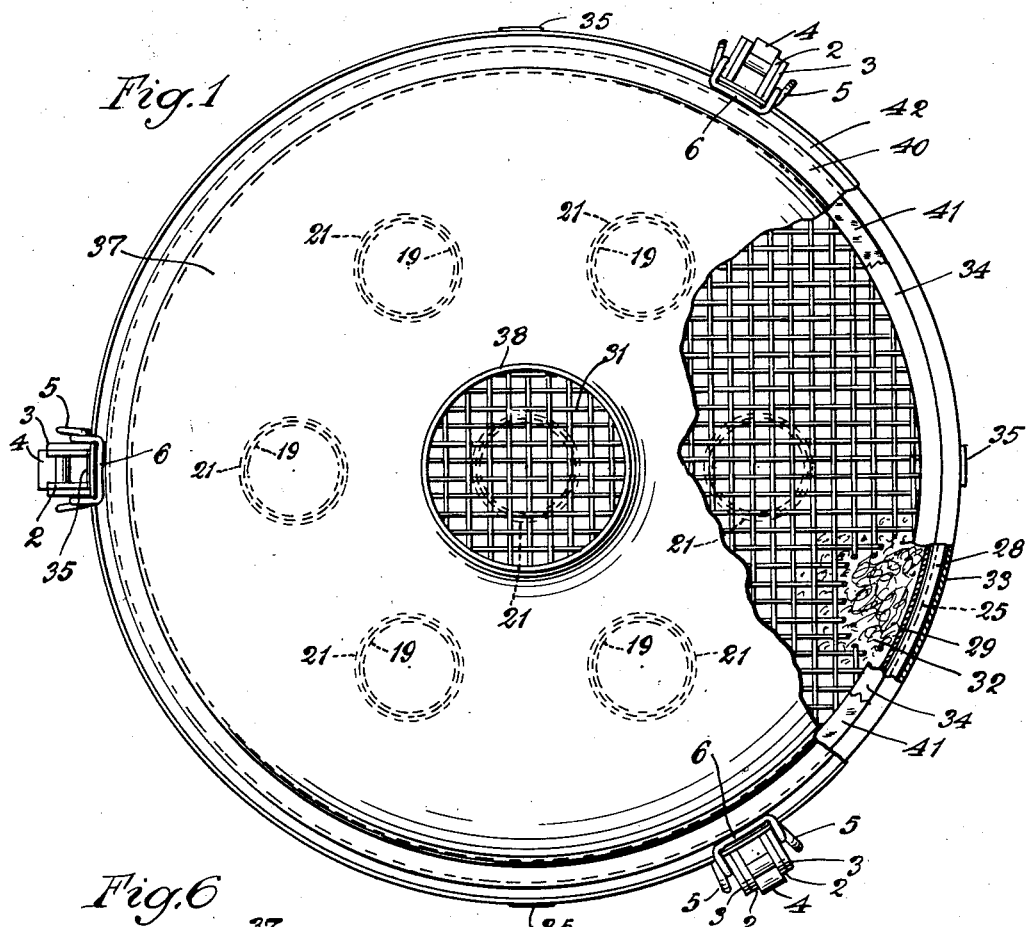
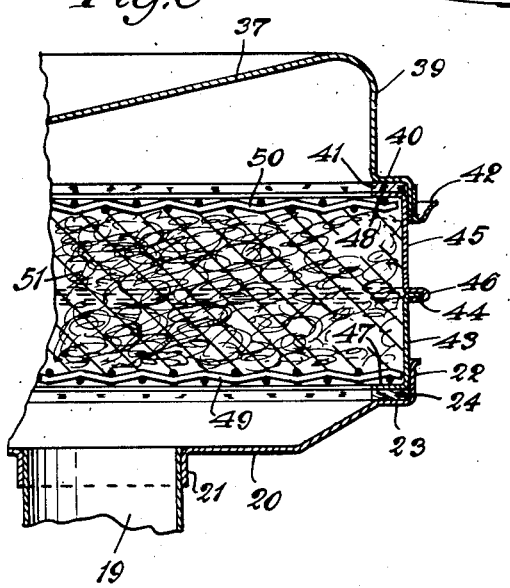
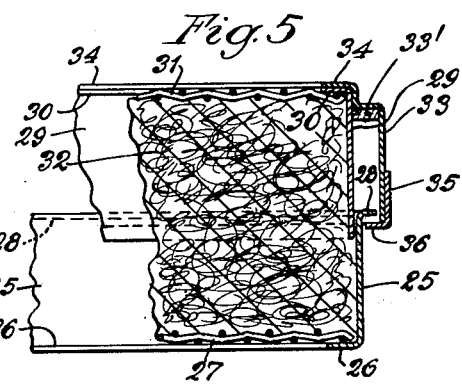
Inventors
Mark L. Blair
David P. Eastman

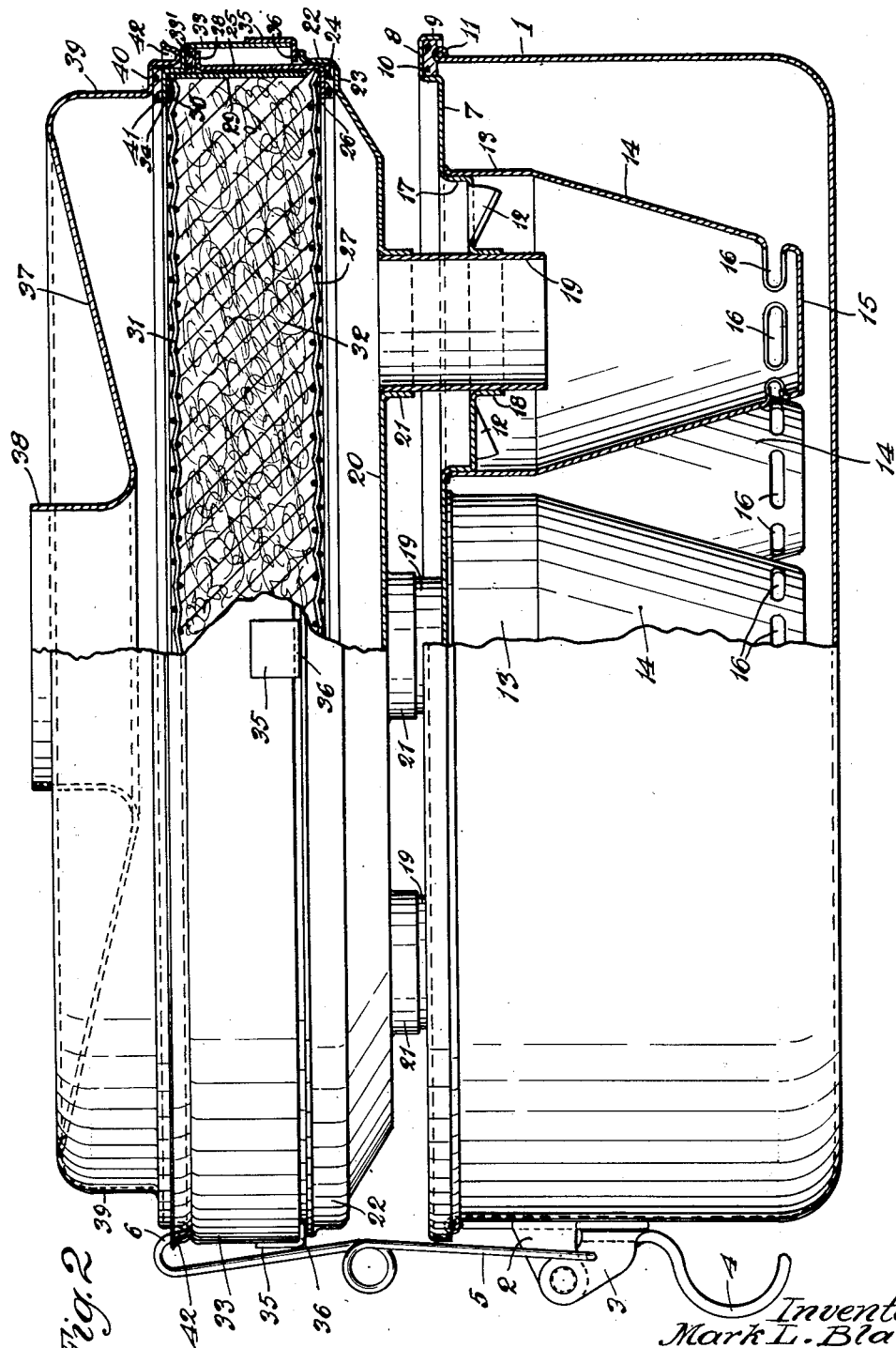

Jan. 1, 1952
M. L. BLAIR ET AL
2,580,648
AIR CLEANER
Filed Jan. 21, 1946
3 Sheets-Sheet 3
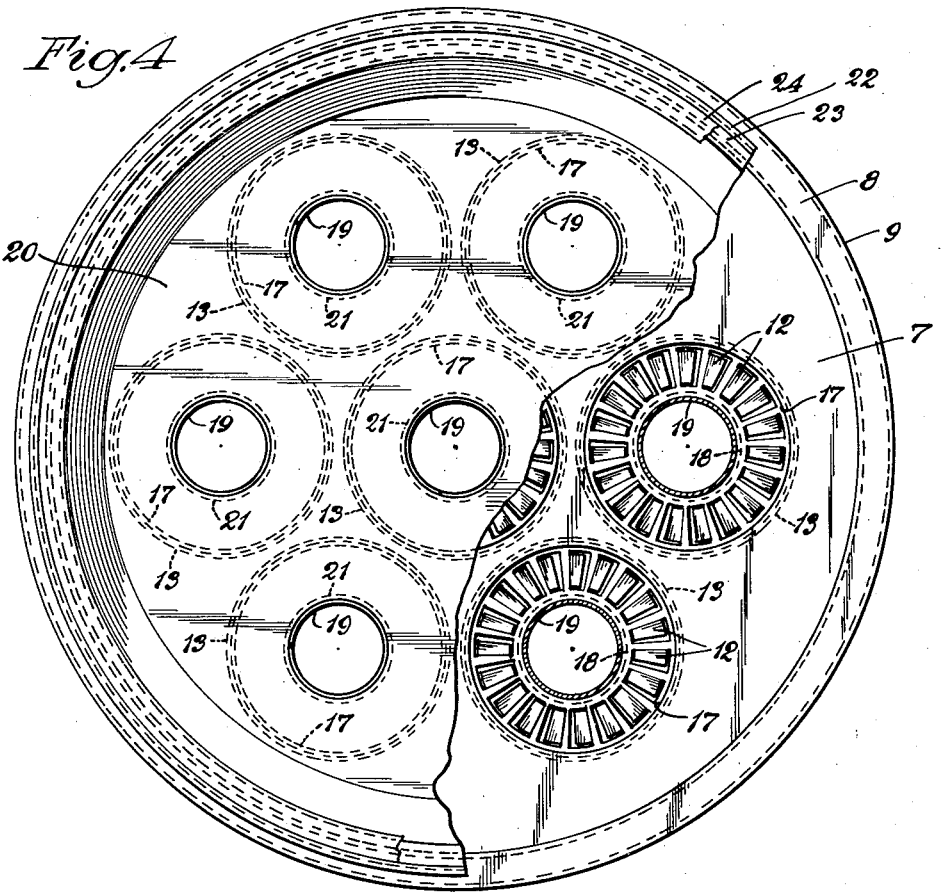
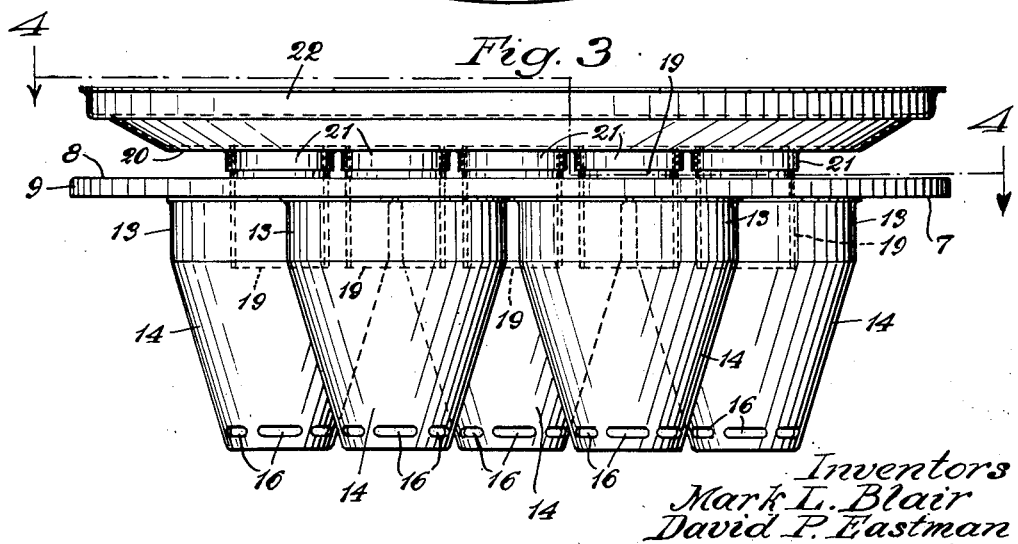
Inventors
Mark L. Blair
David P. Eastman
by Parker + Carter
Attorneys.

Patented Jan. 1, 1952

2,580,648

UNITED STATES PATENT OFFICE 2,580,648

AIR CLEANER

Mark L. Blair, Flossmoor, and David P. Eastman, Chicago, Ill., assignors to United Specialties Company, Chicago, Ill., a corporation of Delaware Application January 21, 1946, Serial No. 642,486

4 Claims. (Cl. 183—34)

This invention relates to an air cleaner and particularly to an air cleaner of the dry type in which the cleaning is accomplished centrifugally without the use of an oil bath or liquid cleaning medium. It has for one object to provide therefore a dry cleaner which is effective in operation and simple in construction.

Another object is to provide a dry cleaner having centrifugal and filtering cleaning means.

Another object is to provide a filter suitable for ready cleaning.

Another object is to provide means in connection with the filter of an air cleaner, whereby the cleaner filter is automatically compressed when in position and automatically expanded when removed from its operative position.

Other objects will appear from time to time in the course of the specification and claims.

The invention is illustrated more or less diagrammatically in the accompanying drawings, wherein:

Figure 1 is a plan view with parts broken away and parts in section;

Figure 2 is a side elevation with parts in vertical section on an enlarged scale;

Figure 3 is a side elevation of the cleaning assembly removed from the housing;

Figure 4 is a transverse section taken at line 4—4 of Figure 3;

Figure 5 is a sectional detail showing the filter assembly of Figure 2 in expanded or inoperative position;

Figure 6 is a sectional detail similar to Figure 5 and showing a modified form of filter member.

Like parts are indicated by like symbols throughout the specification and drawings.

The centrifugal cleaner assembly is positioned in a housing 1 which may have mounted on it brackets 2 to support latching toggle means 3 which are provided with handles 4. Spring latch members 5 are mounted in the toggle portions 3 and each carries a latching hook portion 6.

The centrifugal cleaning assembly in the particular form here shown includes a plate like member 7 having a raised peripheral portion 8 and a peripheral downwardly depending flange 9. A gasket or sealing member 10 may be positioned within the parts 8 and 9. As shown in Figure 2, when the parts are assembled this gasket 10 is in contact with the upper edge 11 of the housing 1.

A plurality of perforations is formed in the member 7 and in each of them a series of vanes 12 is positioned. About each of the perforations in which the vanes 12 are positioned is mounted a hollow chamber forming member 13 which may have inwardly converging sides 14. It has a closed bottom 15 and adjacent the bottom the walls 14 are provided with slots or openings 16. The members 13, 14 are supported upon the plate 7 and may be welded or otherwise secured to portions 17 which as shown are integral with the member 7.

Positioned inwardly with respect to each of the series of vanes 12 is an annular supporting member 18. In each of these members a discharge or outlet tube 19 is positioned. The outlet tubes 19, 19 pass through perforations in a plate 20 and may be engaged in suitably formed portions 21 preferably integral with the plate 20. The plate 20 is provided at its periphery with an upwardly extending annular flange 22 and may be shaped to provide a shoulder or seat 23 for a gasket or sealing member 24.

In the form shown in Figures 2 and 5 a filter assembly is positioned above the mechanical separating assembly just above described. As shown the filter assembly includes a collapsible or telescopic housing within which a mass of filter material is positioned.

The telescopic housing includes upper and lower housing portions. The lower portion comprises an annular member 25 having a flange 26 upon which a screen 27 may be seated. A second outwardly directed flange 28 is positioned on the member 25. The upper housing section of the filter assembly includes an annular member 29 shaped to fit within the member 25 as shown in Figures 2 and 5. At its upper end the member 29 is provided with an inwardly turned flange 30 against which a screen 31 is seated. A mass of filter material 32 is positioned within the housing members 25 and 29 and between the screen sections 27 and 31. As a means for preventing excessive outward movement of the two members 25 and 29 an annular member 33 is secured to the member 29, by means of a flange 34 which is in contact with and may be welded or otherwise secured to the flange 30. At its lower end a retaining member is secured to the member 33 and this includes a part 35 with an inwardly directed portion 36. It will be seen from Figures 2 and 5 that the portion 36 overlaps the flange 28 and thus prevents separation of the sections 25 and 29, but permits some relative expanding movement.

As shown in detail in Figure 2, the filter section is positioned upon the gasket 24. The portion 36 is out of contact with the upper edge of the member 22, and the portion 28 is in contact with a gasket 33'.

A cover or closure plate is provided for the face of the filter assembly opposite that upon which the mechanical cleaning assembly is positioned. This includes a plate 37 with a central outlet connection 38. An annular portion 39 is shaped to provide a shoulder 40. 41 is a gasket or sealing member positioned between the shoulder 40 and the upper surface of the member 34. The cover plate is also shaped to provide at its periphery or adjacent its periphery a groove or trough 42 within which the latch hook members 6 are engaged.

In the modified form of Figure 6 the filter section is not collapsible or telescopic and it is formed of a lower annular member 43 having an outwardly bent flange 44 and an upper annular section 45 provided with a flange 46 to engage the flange 44. The members 43 and 45 are provided respectively with inwardly directed flanges 47 and 48 which support or engage respectively screen sections 49 and 50. A mass of filter material 51 is positioned between the screen sections. The construction of Figure 6 in other respects is substantially the same as that shown in Figures 2 and 5. The trough or groove member 42 which is shown in Figure 2 as being integral with the portion 39 is shown in Figure 6 as being a separately formed member permanently secured thereto.

Where in the specification we have referred to "upper and lower" portions of the cleaner or the cleaner assembly we mean merely those portions which appear toward the top or bottom of the figures as shown. The invention is not limited to use in any position. It may operate in the position shown or might be inverted from the position shown. It might operate in any position.

Although we have shown an operative form of our invention, it will be recognized that many changes in the form, shape and arrangement of parts can be made without departing from the spirit of the invention, and our showing is therefore to be taken as, in a sense, diagrammatic.

The use and operation of the invention are as follows:

When the cleaner is to be used the parts are assembled as in Figure 2. The centrifugal separating assembly fitting within the housing member 1, the filter section being fastened against the shoulder 23 of the plate 20 and the cover plate 37 being held in place. The assembly of the parts is retained by the spring latches shown in Figures 1 and 2.

When the cleaner thus assembled is to be used the outlet tube 38 is connected for example to an internal combustion engine or to a carburetor and when the engine operates air is drawn into the cleaner through the space between the plate 7 and the plate 20. It passes through the various sets of blades 12 and is thus caused to rotate. All of the air which passes into the system of the cleaner passes through one of the sets of blades and into one of the members 13, 14. The rotation which has been set up by the blades 12 causes the heavier particles of foreign matter to move outwardly and to be deposited against the wall portions 14 or to fall to or toward the bottom 15. This foreign material will be discharged through the slots or openings 16 and retained in the housing 1. There relatively cleaner air passes upwardly through one or another of the tubular members 19 and into the filter assembly and to and through the filter material 32. This material may be metal wool or synthetic or animal or vegetable fiber. In this mass of filter material additional foreign matter will be removed from the moving column of air and the cleaned air will pass outwardly through the connection 38 and to any source of use.

When the filter requires cleaning the latches are loosened, the cover plate is removed, the filter assembly is removed and if it is in the form shown in Figures 2 and 5 it will expand to the position of Figure 5 and under the influence of the filter material 32. This filter mass is then opened so that it may be readily washed or otherwise cleaned. While the cleaner is still not assembled the housing 1 may be removed and the dust and foreign material dumped from it. Similarly any foreign material which may have remained in the members 13 and 14 can also be shaken, blown or otherwise removed from them. When the parts have been cleaned they are reassembled. The filter mass 32 is compressed upon reassembly from the loose condition of Figure 5 to the compressed condition of Figure 2.

By reason of the telescopic arrangement of the housing which encloses the filter mass 32 that mass is automatically upon assembly compressed to a condition for efficient filtering and it is automatically opened or separated upon disassembly to a condition for suitable cleaning. A filter mass sufficiently compressed for adequate filtering is difficult to clean and a filter mass loose enough for adequate cleaning is not effective as a filter. Thus the telescopic housing arrangement produces satisfactory filtering and permits adequate cleaning.

We claim:

1. In combination in an air cleaner, a plurality of primary air cleaning cells, a common housing therefor having an inlet opening for each of said primary cells, each of said cells including an annular inwardly tapering side wall portion and a transversely disposed closed end wall, each of said side walls being provided with a laterally disposed waste discharge opening adjacent to said end wall and an air discharge passage coaxially disposed with respect to the inlet opening, and a filter cell including a housing member provided with a plurality of air inlet openings in communication respectively with the air discharge passages of the primary cells and having a common air discharge passage, and a mass of filter material positioned within the filter cell housing in the air stream between the air inlet openings and the air discharge passage thereof.

2. The apparatus described in claim 1 wherein the filter cell housing and the primary cell housing are mounted in axially spaced relation to provide an intermediate air space in communication with the air inlet openings of the primary cells.

3. The apparatus described in claim 1 wherein said filter cell housing includes relatively movable, telescopically interfitting inner and outer frame members between which the filter mass is disposed, and releasable tension means operatively connected to the outer frame member and the primary cell housing whereby to maintain the filter cell housing and the primary cell housing in assembled relation with the frame members urged towards each other and the interposed filter mass under compression.

4. The apparatus described in claim 1 wherein the several inlet openings for the primary cells are arranged in an annular series around a central axis, and wherein the discharge passage for the filter cell is disposed substantially centrally of said axis.

MARK L. BLAIR.
DAVID P. EASTMAN.

REFERENCES CITED

The following references are of record in the file of this patent:

UNITED STATES PATENTS

| Number | Name | Date |
|---|---|---|
| 1,405,399 | Donaldson | Feb. 7, 1922 |
| 1,566,607 | Jordahl | Dec. 22, 1925 |
| 1,751,915 | Hall et al. | Mar. 25, 1930 |
| 1,944,279 | Skelton | Jan. 23, 1934 |
| 2,004,468 | Hawley | June 11, 1935 |
| 2,198,963 | Garner | Apr. 30, 1940 |
| 2,201,301 | Richardson | May 21, 1940 |
| 2,360,355 | McBride et al. | Oct. 17, 1944 |